(12) United States Patent
Jiang et al.

(10) Patent No.: US 11,431,637 B2
(45) Date of Patent: Aug. 30, 2022

(54) NETWORK CONGESTION CONTROL METHOD, APPARATUS, AND SYSTEM

(71) Applicant: Huawei Technologies Co., Ltd., Shenzhen (CN)

(72) Inventors: Jingjie Jiang, Shenzhen (CN); Bo Bai, Hong Kong (CN); Gong Zhang, Shenzhen (CN); Chen Tian, Shenzhen (CN); Wei Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 17/011,705

(22) Filed: Sep. 3, 2020

(65) Prior Publication Data

US 2020/0403924 A1 Dec. 24, 2020

Related U.S. Application Data

(63) Continuation of application No. PCT/CN2019/124621, filed on Dec. 11, 2019.

(30) Foreign Application Priority Data

Dec. 20, 2018 (CN) .......................... 201811565434.0

(51) Int. Cl.
*H04L 47/215* (2022.01)
*H04L 43/0829* (2022.01)
(Continued)

(52) U.S. Cl.
CPC ........ *H04L 47/215* (2013.01); *H04L 43/0829* (2013.01); *H04L 47/283* (2013.01); *H04L 47/6215* (2013.01); *H04L 47/6275* (2013.01)

(58) Field of Classification Search
CPC . H04L 47/215; H04L 43/0829; H04L 47/283; H04L 47/6215; H04L 47/6275;
(Continued)

(56) References Cited

U.S. PATENT DOCUMENTS

2006/0168337 A1 7/2006 Stahl et al.
2013/0044745 A1* 2/2013 Imamura ............... H04L 47/215
370/351
(Continued)

FOREIGN PATENT DOCUMENTS

CN 101119492 A 2/2008
CN 101217495 A 7/2008
(Continued)

OTHER PUBLICATIONS

Alizadeh, M. et al. "Data Center TCP (DCTCP)", SIGCOMM '10, New Delhi, India, Aug. 30-Sep. 3, 2010, 12 pages.
(Continued)

*Primary Examiner* — Pao Sinkantarakorn
*Assistant Examiner* — Kabir U Jahangir
(74) *Attorney, Agent, or Firm* — Slater Matsil, LLP

(57) ABSTRACT

A transit device receives a target token request sent by a data transmit end, and sends the target token request to a data receive end. The data receive end may determine, based on the target token request, a target token packet corresponding to the target token request, and then send the target token packet to the transit device based on a priority identifier. The transit device determines a sending rate of the token packet based on a link bandwidth of the current device, a preset packet length of a token packet, and a preset packet length of the data packet, and sends the target token packet to the data transmit end based on the priority identifier and the sending rate of the token packet. The transit device may send the target data packet to the data receive end.

19 Claims, 6 Drawing Sheets

(51) Int. Cl.
*H04L 47/283* (2022.01)
*H04L 47/62* (2022.01)
*H04L 47/6275* (2022.01)

(58) Field of Classification Search
CPC ..... H04L 47/2433; H04L 47/25; H04L 47/12; H04L 47/263
See application file for complete search history.

(56) References Cited

U.S. PATENT DOCUMENTS

| | | | |
|---|---|---|---|
| 2013/0215733 A1 | 8/2013 | Jiang et al. | |
| 2014/0164640 A1 | 6/2014 | Ye et al. | |
| 2016/0330299 A1 | 11/2016 | Hu | |
| 2017/0054645 A1* | 2/2017 | Nishimura | H04W 4/08 |
| 2017/0054646 A1* | 2/2017 | Kitada | H04L 47/215 |

FOREIGN PATENT DOCUMENTS

| | | |
|---|---|---|
| CN | 101741603 A | 6/2010 |
| CN | 101808037 A | 8/2010 |
| CN | 102217258 A | 10/2011 |
| CN | 105939286 A | 9/2016 |
| CN | 108092921 A | 5/2018 |
| CN | 108809988 A | 11/2018 |
| WO | 2014031104 A1 | 2/2014 |
| WO | 2018223965 A1 | 12/2018 |

OTHER PUBLICATIONS

Cho, I. et al., "Credit-Scheduled Delay-Bounded Congestion Control for Datacenters", SIGCOMM '17, Los Angeles, CA, USA, Aug. 21-25, 2014, pp. 239-252.
Cisco Systems Inc., "Cisco Global Cloud Index: Forecast and Methodology, 2016-2021", White Paper, Feb. 2018, 46 pages.
Gao, P.X. et al., "pHost: Distributed Near-Optimal Datacenter Transport Over Commodity Network Fabric", CoNEXT 15, Heidelberg, Germany, Dec. 1-4, 2015, 12 pages.
Jacobson, V., "Congestion Avoidance and Control", ACM SIGCOMM 1988, Stanford, CA, USA, Aug. 16-18, 1988, pp. 314-329.
Mittal, R. et al., "TIMELY: RTT-based Congestion Control for the Datacenter", SIGCOMM, '15, London, UK, Aug. 17-21, 2015, pp. 537-550.
Montazeri, B. et al., "Homa: A Receiver-Driven Low-Latency Transport Protocol Using Network Priorities (Complete Version)", SIGCOMM, 2018, arXiv:1803.09615v2 [cs.NI], Jun. 27, 2018, 20 pages.
Jinku, L. et al., "Dynamic Bandwidth Allocation Algorithm Based on Network Processor", China Academic Journal Electronic Publishing House, vol. 39, No. 12, Dec. 2005, pp. 1323-1326.

* cited by examiner

NETWORK CONGESTION CONTROL METHOD, APPARATUS, AND SYSTEM

CROSS-REFERENCE TO RELATED APPLICATIONS

This application is a continuation of International Application No. PCT/CN2019/124621, filed on Dec. 11, 2019, which claims priority to Chinese Patent Application No. 201811565434.0, filed on Dec. 20, 2018. The disclosures of the aforementioned applications are hereby incorporated by reference in their entireties.

TECHNICAL FIELD

This application relates to the field of big data technologies, and in particular, to a network congestion control method, apparatus, and system.

BACKGROUND

Rapid development of Internet technologies brings about an enormous requirement for data and information processing, and more data is concentrated in a data center network for processing.

In a related art, a congestion control method is generally as follows: A data transmit end may collect a congestion signal, and dynamically adjust a congestion control window of the data transmit end based on the congestion signal, to adjust a sending rate of a data packet. For example, the data transmit end may detect a round-trip time (RTT) of each data packet, infer a queuing latency in a network based on the RTT, and when the queuing latency increases, decrease the sending rate of the data packet, or when the queuing latency decreases, increase the sending rate of the data packet.

In a process of implementing this application, the inventors find that the related art has at least the following problem:

The data transmit end collects the congestion signal, and can obtain the congestion signal and then adjust a congestion control window only after congestion occurs in a network. Therefore, after the data transmit end collects the congestion signal, a relatively high queuing latency may already occur in the network, and a large quantity of packets are lost.

SUMMARY

To resolve a problem that a large quantity of packets are lost, embodiments of this application provide a network congestion control method, apparatus, and system. The technical solutions are as follows:

According to a first aspect, a network congestion control method is provided, where the method includes: receiving a target token request sent by a data transmit end, where the target token request carries an identifier of a data stream, a data volume of the data stream, and a data type; forwarding the target token request to a data receive end; receiving a target token packet that is determined based on the target token request and that is sent by the data receive end, where the target token packet includes a priority identifier of the data stream and the identifier of the data stream; determining a sending rate of a token packet based on a link bandwidth of a current device, a preset packet length of a token packet, and a preset packet length of a data packet; and sending the target token packet to the data transmit end based on the priority identifier and the sending rate of the token packet, so that the data transmit end sends a target data packet corresponding to the target token packet to the data receive end based on the target token packet.

In the solution of this embodiment of this application, before sending data to the data receive end, the data transmit end may first set up a connection to the data receive end, and then may generate a token request (which may be subsequently referred to as the target token request), include the identifier of the data stream, the data volume of the data stream, and the data type in the target token request, and send the target token request. A transit device is a switch between the data transmit end and the data receive end. In this way, the transit device can receive the target token request sent by the data transmit end, and the transit device can send the target token request to the data receive end.

Subsequently, the transit device may receive the target token packet that is sent by the data receive end and that corresponds to the target token request. Then, the transit device may determine the sending rate of the token packet based on the link bandwidth of the current device, the preset packet length of the token packet, and the preset packet length of the data packet, and then send the target token packet to the data transmit end based on the sending rate of the token packet, so that the data transmit end can send the data packet corresponding to the target token packet to the data receive end. Because the transit device can determine the sending rate of the token packet, and can send the token packet based on the priority identifier and the sending rate, network congestion can be controlled actively during data sending, and a possibility of network congestion can be reduced, to reduce a packet loss rate of a data packet, implement low-latency data transmission, and further ensure high bandwidth utilization and high throughput of a network.

In a possible implementation, the determining a sending rate of a token packet based on a link bandwidth of a current device, a preset packet length of a token packet, and a preset packet length of a data packet includes: determining the sending rate of the token packet based on the link bandwidth of the current device, the preset packet length of the token packet, the preset packet length of the data packet, and a formula $W*A/(A+B)$, where W is the link bandwidth, A is the preset packet length of the token packet, and B is the preset packet length of the data packet.

In a possible implementation, the forwarding the target token request to a data receive end includes: adding the target token request to a first queue, where the first queue is a queue having a highest priority in the current device; and when it is time to send the target token request queuing in the first queue, forwarding the target token request to the data receive end.

In the solution of this embodiment of this application, after receiving the target token request, the transit device adds the target token request to the first queue, and then may send the target token request to the data receive end when it is time to send the queuing target token request. Because a token request is sent in the queue having the highest priority, the token request is sent based on the highest priority in a transmission process, and is not discarded.

In a possible implementation, the sending the target token packet to the data transmit end based on the priority identifier and the sending rate of the token packet includes: adding, based on the priority identifier, the target token packet to a second queue corresponding to the priority identifier, where a priority of the second queue is lower than the priority of the first queue; and when it is determined to send the target token packet in the second queue, sending the target token packet to the data transmit end based on the sending rate of the token packet.

The priority of the second queue is lower than the priority of the first queue. There is only one first queue, there may be a plurality of second queues, and the second queues correspond to different priority identifiers. For example, six second priority queues may be set.

In the solution of this embodiment of this application, the transit device may parse the target token packet to obtain the priority identifier, then determine, based on the priority identifier, the second queue corresponding to the priority identifier, and then add the target token packet to the second queue corresponding to the priority identifier. When it is time to send the target token packet queuing in the second queue corresponding to the priority identifier, the transit device may send the target token packet to the data transmit end based on the sending rate of the token packet. In this way, it can be ensured that a token request is sent first.

In a possible implementation, the method further includes: when the target data packet corresponding to the target token packet is received, adding the target data packet to a third queue, where a priority of the third queue is lower than the priority of the second queue; and when it is time to send the target data packet queuing in the third queue, sending the target data packet to the data receive end.

The priority of the third queue is lower than the priority of the second queue. The third queue is a queue having a lowest priority.

In the solution of this embodiment of this application, when receiving the data packet that is sent by the data transmit end and that corresponds to the target token packet, the transit device may add the target data packet to the third queue, and then may send the target data packet to the data receive end when it is time to send the target data packet queuing in the third queue.

In a possible implementation, the method further includes: receiving a token transmission termination message sent by the data transmit end, where the token transmission termination message carries the identifier of the data stream; and sending the token transmission termination message to the data receive end, so that the data receive end no longer sends a token packet corresponding to the data stream.

In the solution of this embodiment of this application, the data transmit end determines, based on a total data volume of data packets sent to the data receive end, that the data stream sent to the data receive end is completely sent, and then may generate the token transmission termination message, include the identifier of the data stream in the token transmission termination message, and then send the token transmission termination message to the transit device.

After receiving the token transmission termination message, the transit device may add the token transmission termination message to the first queue, and when it is time to send the token termination message queuing in the first queue, the transit device may send the token transmission termination message to the data receive end.

After receiving the token transmission termination message, the data receive end may obtain the identifier of the data stream through parsing, determine that the data stream is completely sent, and may stop generating a token packet corresponding to the data stream. In this way, the data receive end can be controlled in time to not send a token packet any more.

According to a second aspect, a network congestion control method is provided, where the method includes: receiving a target token request sent by a transit device, where the target token request carries an identifier of a data stream, a data volume of the data stream, and a data type; determining, based on the target token request, a target token packet corresponding to the target token request, where the target token packet includes a priority identifier of the data stream and the identifier of the data stream; sending the target token packet to the transit device based on the priority identifier, so that the transit device sends the target token packet to a data transmit end; and receiving a target data packet that is forwarded by the transit device and that corresponds to the target token packet.

In the solution of this embodiment of this application, a data receive end may receive the target token request sent by the transit device, and then determine the target token packet corresponding to the target token request, where the target token packet includes the priority identifier of the data stream and the identifier of the data stream. Then, the data receive end sends the target token packet to the transit device based on the priority identifier, so that the transit device sends the target token packet to the data transmit end. Finally, the data receive end may receive the target data packet that is sent by the transit device and that corresponds to the target token packet.

In a possible implementation, the determining, based on the target token request, a target token packet corresponding to the target token request includes: determining the priority identifier of the data stream based on the data volume of the data, the data type, and information about currently transmitted data, and assembling the identifier of the data stream and the priority identifier into the target token packet corresponding to the target token request.

In the solution of this embodiment of this application, after receiving the target token request, the data receive end may parse the target token request to obtain the identifier of the data stream, the data volume of the data stream, and the data type that are carried in the target token request. Then, the data receive end may determine the priority identifier of the data stream based on the data volume of the data stream, the data type, and the information about the currently transmitted data, and then add the identifier of the data stream and the priority identifier to the target token packet.

In a possible implementation, the method further includes: determining a sequence number of the target token packet based on the identifier of the data stream; and the assembling the identifier of the data stream and the priority identifier into the target token packet corresponding to the target token request includes assembling the identifier of the data stream, the sequence number of the target token packet, and the priority identifier into the target token packet corresponding to the target token request.

In the solution of this embodiment of this application, for the data stream corresponding to the identifier of the data stream, when a token packet is generated, a sequence number is generated, where the sequence number is used to indicate a place of the token packet generated in the data stream corresponding to the identifier of the data stream. For example, if the target token packet is the third token packet that is generated, the sequence number is 3. Then, the data receive end may assemble the identifier of the data stream, the sequence number of the target token packet, and the priority identifier into the target token packet corresponding to the target token request. This facilitates the data receive end in determining whether a data packet corresponding to the token packet has been received.

In a possible implementation, the sending the target token packet to the transit device based on the priority identifier includes: if it is time to send the target token packet based on the priority identifier and a sending rule, determining a sending rate of the target token packet; and sending the target token packet to the transit device based on the sending rate of the target token packet.

In the solution of this embodiment of this application, the data receive end may set up a corresponding queue for each data stream for which a token request has been received, where a token packet having a higher priority in the queue is sent preferentially. When it is time to send the target token packet based on the priority identifier of the target token packet, the data receive end may determine the sending rate of the target token packet, and then send the target token packet to the transit device based on the sending rate of the target token packet. In this way, a token packet is sent based on a particular sending rate, so that a sending rate of a data packet can be controlled.

In a possible implementation, the determining a sending rate of the target token packet includes: subtracting a sending rate of a token packet of a data stream currently being sent from a maximum sending rate of the current device, to obtain the sending rate of the target token packet.

In the solution of this embodiment of this application, the data receive end may obtain a bandwidth of the data receive end, may obtain a data volume of each token packet, and then divide the bandwidth of the data receive end by the data volume of each token packet, to obtain a quantity of token packets that can be sent within one unit of time, namely, the maximum sending rate of the current device, for example, sending 10 token packets per second. Then, the data receive end determines a sending rate of a token packet of a data stream other than the data stream in data streams currently being sent, and subtracts the sending rate of the token packet of the other data stream from the maximum sending rate, to obtain the sending rate of the target token packet.

In a possible implementation, the method further includes: for the data stream, if a packet loss rate of a token packet of the data stream is greater than a preset packet loss rate, decreasing a sending rate of the token packet based on a current sending rate; or if a packet loss rate of a token packet of the data stream is less than a preset packet loss rate, increasing a sending rate of the token packet based on a current sending rate, where the packet loss rate of the token packet is equal to a ratio of a quantity of token packets lost in one RTT to a quantity of sent token packets.

In the solution of this embodiment of this application, for the data stream to which the target token packet belongs, after receiving a data packet, the data receive end may obtain a sequence number through parsing, and mark a token packet corresponding to the sequence number as used. In this way, the data receive end can determine a sent token packet whose corresponding data has been received. For any token packet, the data receive end may record a sending time point of the token packet, record a receiving time point of a data packet corresponding to the token packet, and then calculate a time difference. The data receive end may determine a quantity of token packets sent in this time period, may determine a quantity of token packets lost in this time period, and then obtain a ratio of the quantity of lost token packets to the quantity of sent token packets.

Then, the data receive end may compare the ratio with the preset packet loss rate. If the ratio is greater than the preset packet loss rate, the data receive end decreases the sending rate of the token packet based on the current sending rate of the data stream to which the target token packet belongs, to decrease the packet loss rate; if the ratio is less than the preset packet loss rate, the data receive end increases the sending rate of the token packet based on the current sending rate of the data stream to which the target token packet belongs, to improve bandwidth utilization of the data receive end; or if the ratio is equal to the preset packet loss rate, the data receive end does not adjust the current sending rate of the data stream to which the target token packet belongs.

In this way, the data receive end can dynamically adjust sending rates of token packets of different data streams based on the packet loss rate. Because the transit device preferentially transmits a token packet of a data stream having a higher priority, a packet loss rate of the corresponding token packet is lower, and the data receive end obtains a higher sending rate of the token packet, to preferentially complete transmission of the data stream having the higher priority. In addition, an algorithm of adjusting, by the data receive end, a sending rate of a token packet ensures that data streams having different priorities can converge quickly to achieve a stable rate, to implement full utilization of a bandwidth, in other words, bandwidth utilization.

In a possible implementation, the target token request further includes a sending time point of the target token request, and the method further includes: if a time interval between the sending time point and a current time point exceeds a preset threshold, discarding the target token request.

In the solution of this embodiment of this application, after receiving the target token request, the data receive end may obtain the sending time point of the target token request through parsing, then determine a receiving time point of the target token request, calculate a difference between the receiving time point and the sending time point, and if the difference is greater than a preset threshold, discard the target token request. In this way, a network transmission resource can be saved.

According to a third aspect, a transit device is provided. The transit device includes a processor and a memory. The memory is configured to store an instruction executable by the processor. The processor executes the instruction to implement the network congestion control method provided in the first aspect.

According to a fourth aspect, a data receive end is provided. The data receive end includes a processor and a memory. The memory is configured to store an instruction executable by the processor. The processor executes the instruction to implement the network congestion control method provided in the second aspect.

According to a fifth aspect, a transit device is provided. The transit device includes one or more modules, to implement the network congestion control method provided in the first aspect.

According to a sixth aspect, a data receive end is provided. The data receive end includes one or more modules, to implement the network congestion control method provided in the second aspect.

According to a seventh aspect, a computer-readable storage medium is provided. The computer-readable storage medium stores an instruction. When the computer-readable storage medium is run on a transit device, the transit device is enabled to perform the network congestion control method provided in the first aspect.

According to an eighth aspect, a computer-readable storage medium is provided. The computer-readable storage medium stores an instruction. When the computer-readable storage medium is run on a data receive end, a transit device is enabled to perform the network congestion control method provided in the second aspect.

According to a ninth aspect, a computer program product including an instruction is provided. When the computer program product is run on a transit device, the transit device is enabled to perform the network congestion control method provided in the first aspect.

According to a tenth aspect, a computer program product including an instruction is provided. When the computer program product is run on a data receive end, the data receive end is enabled to perform the network congestion control method provided in the second aspect.

According to an eleventh aspect, a network congestion control system is provided. The system includes a data receive end and a transit device. The transit device is the transit device described in the third aspect, and the data receive end is the data receive end described in the fourth aspect.

The technical solutions provided in the embodiments of this application include at least the following beneficial effects:

In the embodiments of this application, the transit device may receive the target token request sent by the data transmit end, where the target token request carries the identifier of the data stream, the data volume of the data stream, and the data type. Then, the transit device sends the target token request to the data receive end, and after receiving the target token request, the data receive end may determine, based on the target token request, the target token packet corresponding to the target token request, where the target token packet includes the priority identifier of the data stream and the identifier of the data stream. Then, the data receive end sends the target token packet to the transit device based on the priority identifier. After receiving the target token packet, the transit device may determine the sending rate of the token packet based on the link bandwidth of the current device, the preset packet length of the token packet, and the preset packet length of the data packet, and then send the target token packet to the data transmit end based on the priority identifier and the sending rate of the token packet, so that the data transmit end sends the target data packet corresponding to the target token packet to the data receive end based on the target token packet. After receiving the target data packet sent by the data transmit end, the transit device may send the target data packet to the data receive end. Because the transit device can determine the sending rate of the token packet, and can send the token packet based on the priority identifier and the sending rate, network congestion can be controlled actively during data sending, and a possibility of network congestion can be reduced, to reduce a packet loss rate of a data packet, implement low-latency data transmission, and further ensure high bandwidth utilization and high throughput of a network.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

For ease of understanding the embodiments of this application, the following first describes a system architecture and concepts of terms used in the embodiments of this application.

This application may be applicable to a plurality of application scenarios, and three feasible application scenarios are provided below:

Application Scenario 1

Figure 1:
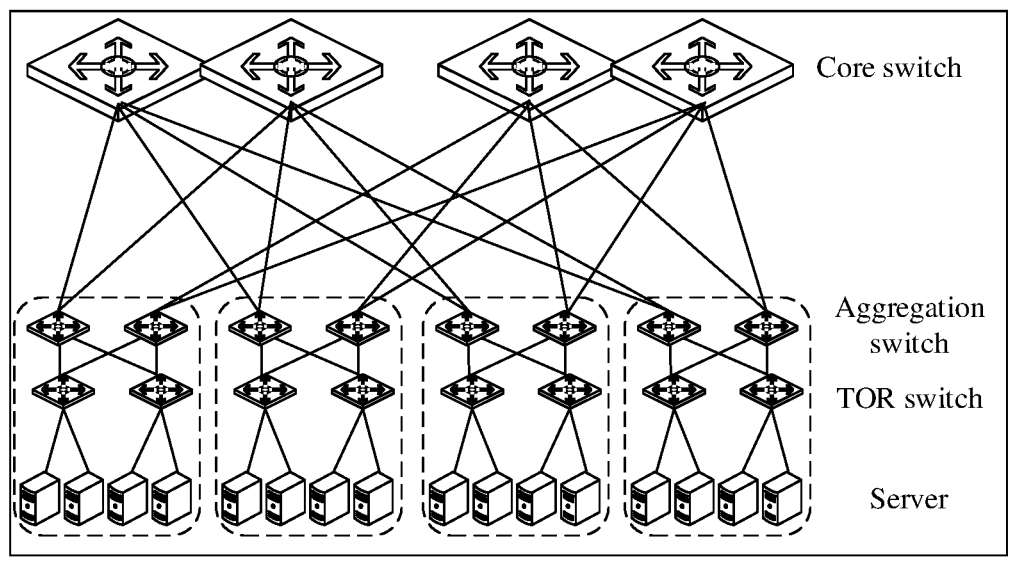
FIG. 1 is a schematic diagram of a network congestion control scenario according to an embodiment of this application.

This application may be applied to a data center network. As shown in FIG. 1, the data center network usually uses a network topology structure of a fat tree, and generally includes servers, top of rack (ToR) switches, aggregation switches, core switches, and the like. The servers used as a data transmit end and a data receive end access a network by using the TOR switches, and the TOR switches and the servers are directly connected to form a cluster, referred to as a point of delivery (POD). A quantity of TOR switches that are in each POD and that are directly connected to the servers is the same as a quantity of aggregation switches connected under a core network. Each POD may be connected to all core switches by using different aggregation switches. In this application, a network congestion control method may be applied to the TOR switches, the aggregation switches, the core switches, and the servers in the data center network.

Application Scenario 2

Figure 2:
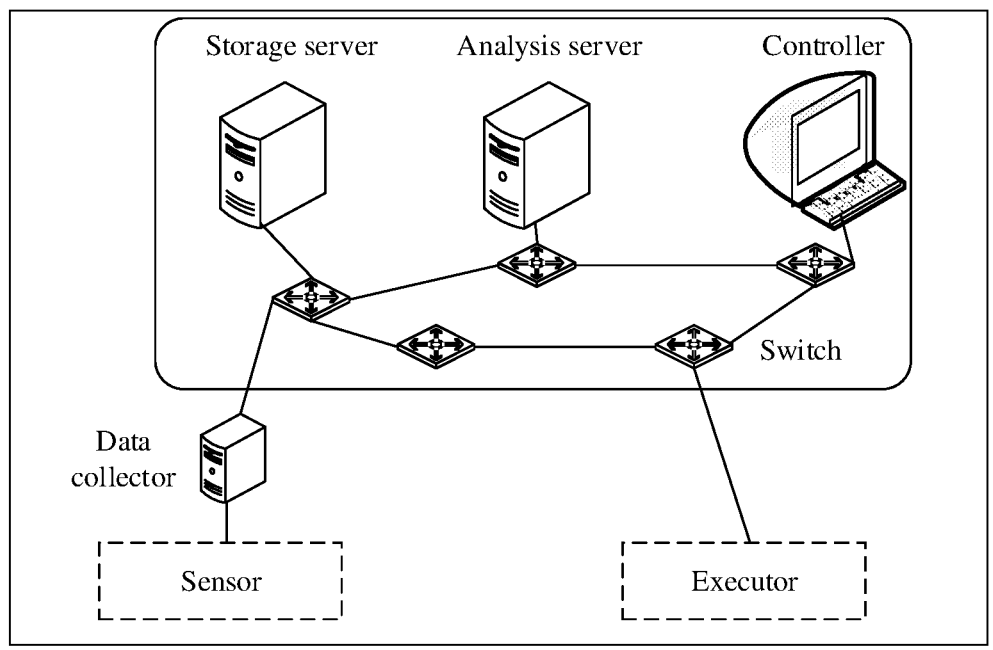
FIG. 2 is a schematic diagram of a network congestion control scenario according to an embodiment of this application.

This application may be further applied to the internet of things. As shown in FIG. 2, network traffic in the internet of things mainly includes three parts, namely, environment and production line data collected by a smart sensor, calculation data generated when parallel calculation and analysis are performed on the collected data, and control data that is conveyed to an executor based on a data analysis result. A data collection apparatus transmits the data collected by the sensor to a data storage server by using a switched network, for storage and backup. A big data analysis server may obtain the data from the storage server, process and analyze the data, and may send an analysis result to a controller, so that the controller makes a decision, and sends a decision result to the executor for operation. In this application, the network congestion control method may be applied to switches, the storage server, the analysis server, the data collector, the controller, and the executor in the internet of things.

Application Scenario 3

Figure 3:
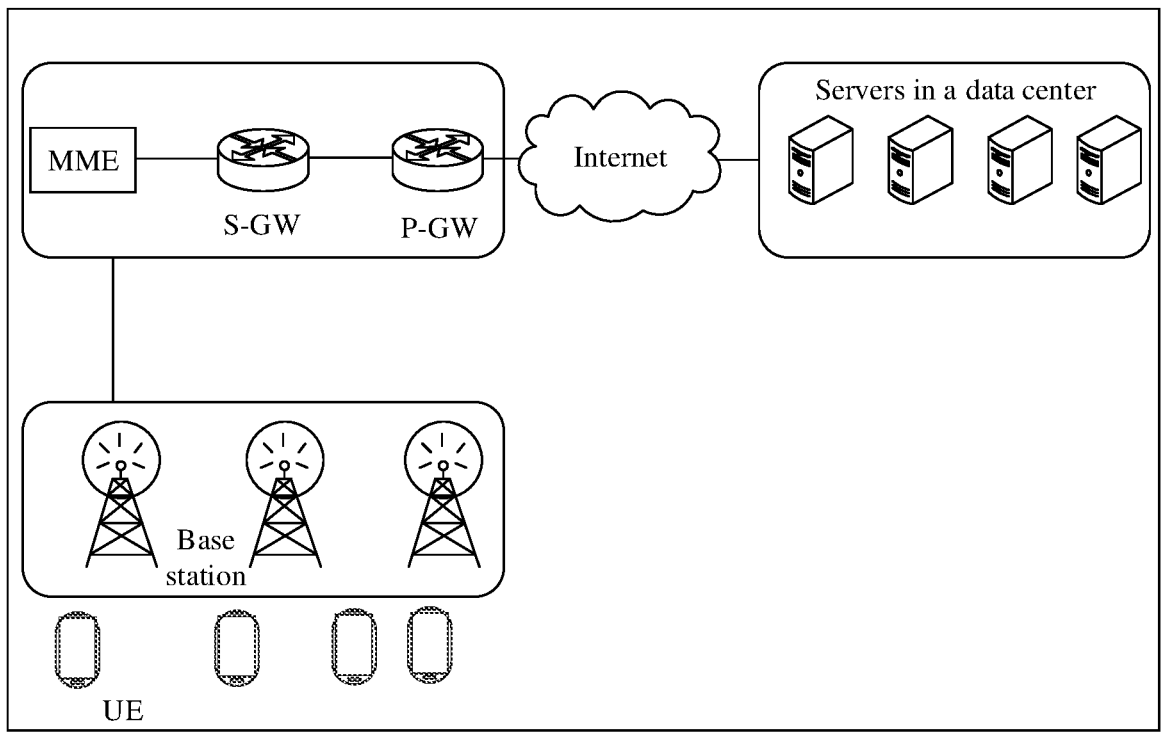
FIG. 3 is a schematic diagram of a network congestion control scenario according to an embodiment of this application.

This application may be further applied to a long term evolution (LTE) network and a 5th generation mobile communications technology (5G) network, which generally include user equipment (UE), base stations (eNodeB), a mobility management entity (MME), a serving gateway (S-GW), a packet data network gateway (P-GW), and servers in a data center. As shown in FIG. 3, the UE sets up connections to the base stations, and the base stations set up connections to the servers in the data center by using the P-GW. User equipment of a network user usually needs to obtain data such as a web page search result and a streaming video from a server in the data center. The user equipment accesses the internet by using an LTE network and a 5G network, sets up a connection to the server in the data center by using the internet, and performs data transmission. In this application, a network congestion control method may be applied to the base stations, the P-GW, and the servers in the data center.

This application provides a network congestion control method. The method may be performed by a transit device and a data receive end. Corresponding to the application scenario 1, the transit device may be one or more of a core switch, an aggregation switch, and a TOR switch, and the data receive end may be a server. Corresponding to the application scenario 2, the transit device may be a switch, and the data receive end may be one or more of a storage server, an analysis server, a controller, and an executor. Corresponding to the application scenario 3, the transit device may be a P-GW, and the data receive end may be a base station, or the transit device may be a switch in the data center, and the data receive end may be a server in the data center.

Figure 4:
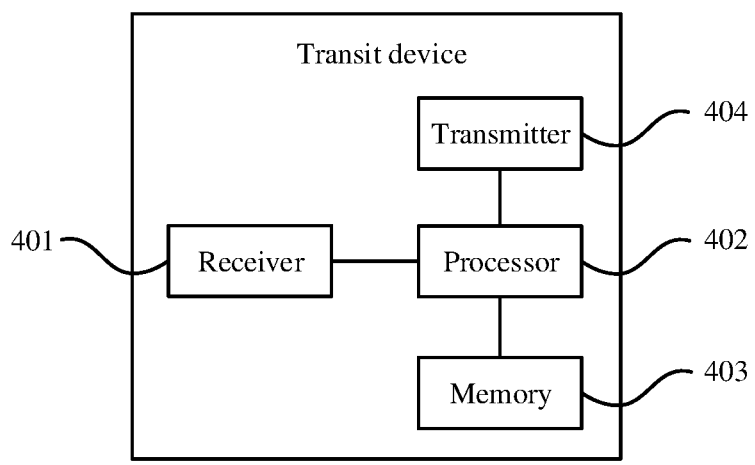
FIG. 4 is a schematic structural diagram of a transit device according to an embodiment of this application.

FIG. 4 is a structural block diagram of a transit device according to an embodiment of this application. The transit device may include at least a receiver 401, a processor 402, a memory 403, and a transmitter 404. The receiver 401 may be configured to receive data. The transmitter 404 may be configured to send data. The memory 403 may be configured to store a software program and a module. The processor 402 runs the software program and the module that are stored in the memory 403, to perform various function application and data processing. The memory 403 may mainly include a program storage region and a data storage region. The program storage region may store an operating system, an application required by at least one function, and the like. The data storage region may store data and the like created based on use of the transit device. In addition, the memory 403 may include a high speed random access memory, and may further include a non-volatile memory, for example, at least one magnetic disk storage device, a flash memory, or another volatile solid state storage device. Correspondingly, the memory 403 may further include a memory controller, so that the processor 402, the receiver 401, and the transmitter 404 access the memory 403. The processor 402 is a control center of the transit device, connects all parts of the entire transit device by using various interfaces and lines, and runs or executes the software program and/or module stored in the memory 403 and invokes data stored in the memory 403, to perform various functions and data processing of the transit device, to perform entire monitoring on the transit device.

Optionally, the processor 402 may include one or more processing cores. Preferably, the processor 402 may integrate an application processor and a modem processor. The application processor mainly processes an operating system, a user interface, an application, and the like, and the modem processor mainly processes radio communication. It may be understood that the modem processor may not be integrated into the processor 402.

Figure 5:
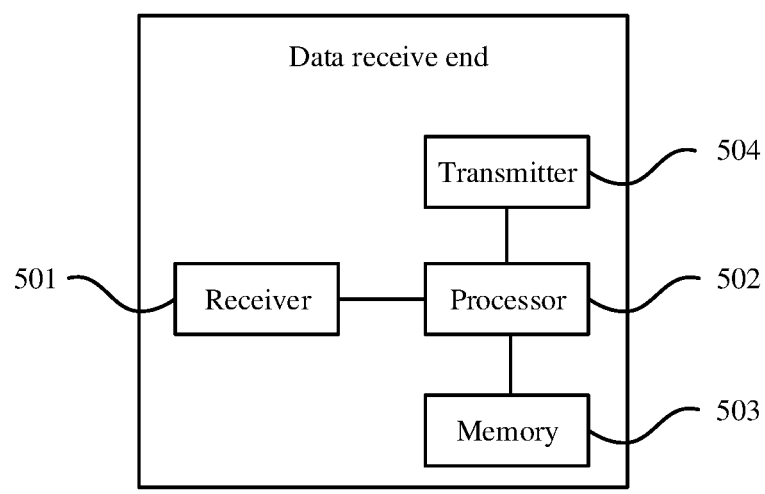
FIG. 5 is a schematic structural diagram of a data receive end according to an embodiment of this application.

FIG. 5 is a structural block diagram of a data receive end according to an embodiment of this application. The data receive end may include at least a receiver 501, a processor 502, a memory 503, and a transmitter 504. The receiver 501 may be configured to receive data. The transmitter 504 may be configured to send data. The memory 503 may be configured to store a software program and a module. The processor 502 runs the software program and the module that are stored in the memory 503, to perform various function application and data processing. The memory 503 may mainly include a program storage region and a data storage region. The program storage region may store an operating system, an application required by at least one function, and the like. The data storage region may store data and the like created based on use of the data receive end. In addition, the memory 503 may include a high speed random access memory, and may further include a non-volatile memory, for example, at least one magnetic disk storage device, a flash memory, or another volatile solid state storage device. Correspondingly, the memory 503 may further include a memory controller, so that the processor 502, the receiver 501, and the transmitter 504 access the memory 503. The processor 502 is a control center of the data receive end, connects all parts of the entire data receive end by using various interfaces and lines, and runs or executes the software program and/or module stored in the memory 503 and invokes data stored in the memory 503, to perform various functions and data processing of the data receive end, to perform entire monitoring on the data receive end.

Optionally, the processor 502 may include one or more processing cores. Preferably, the processor 502 may integrate an application processor and a modem processor. The application processor mainly processes an operating system, a user interface, an application, and the like, and the modem processor mainly processes radio communication. It may be understood that the modem processor may not be integrated into the processor 502.

Figure 6:
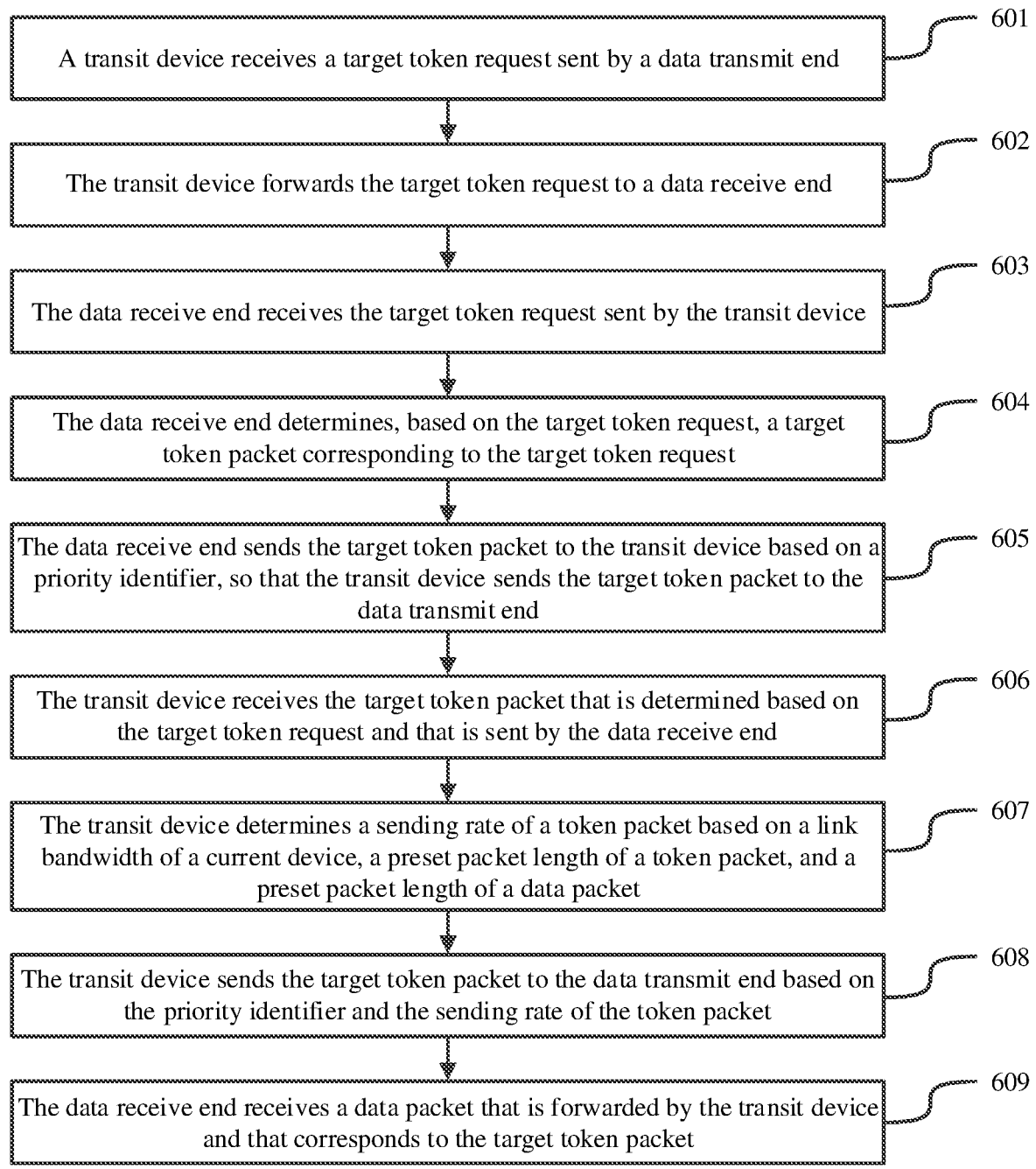
FIG. 6 is a schematic flowchart of a network congestion control method according to an embodiment of this application.

An embodiment of this application provides a network congestion control method, which may be applied to the foregoing three application scenarios. As shown in FIG. 6, a process of performing the method may be as follows.

Step 601: A transit device receives a target token request sent by a data transmit end, where the target token request carries an identifier of a data stream, a data volume of the data stream, and a data type.

The data stream is video data, web page data, audio data, or the like. The identifier of the data stream is used to indicate a data stream sent by the data transmit end to a data receive end. The data volume of the data stream is used to indicate a data volume of the data stream sent by the data transmit end to the data receive end. The data type is used to indicate a type of the data stream sent by the data transmit end to the data receive end, for example, a video type or a non-video type.

During implementation, before sending data to the data receive end, the data transmit end may first set up a connection to the data receive end, where the connection may be a transmission control protocol (TCP) connection. Then, the data transmit end may generate a token request (which may be subsequently referred to as the target token request), include the identifier of the data stream, the data volume of the data stream, and the data type in the target token request, and send the target token request. The transit device may be a device (for example, the P-GW in the application scenario 3) between the data transmit end and the data receive end. In this way, the transit device can receive the target token request sent by the data transmit end.

It should be noted that when data of a data stream is sent, a token request is sent at the start. Subsequently, when a new data stream is started, a token request is sent again, and there is no need to send a token request each time when a data packet of a same data stream is sent.

Step 602: The transit device forwards the target token request to the data receive end.

During implementation, after receiving the target token request, the transit device may send the target token request to the data receive end.

It should be noted that because a type of the target token request is different from a type of another message, the transit device can recognize the target token request, and send the target token request to the data receive end.

Optionally, the target token request is sent based on a highest priority, and corresponding processing of step 602 may be as follows: adding the target token request to a first queue, and when it is time to send the target token request queuing in the first queue, forwarding the target token request to the data receive end.

The first queue may be a queue having a highest priority in the transit device, that is, a token request in the first queue is sent before data in other queues in order of precedence.

During implementation, after receiving the target token request, the transit device adds the target token request to the first queue, and then may send the target token request to the data receive end when it is time to send the queuing target token request.

Because a token request is sent in the queue having the highest priority, the token request is sent based on the highest priority in a transmission process, and is not discarded.

Step 603: The data receive end receives the target token request sent by the transit device, where the target token request carries the identifier of the data stream, the data volume of the data stream, and the data type.

Step 604: The data receive end determines, based on the target token request, a target token packet corresponding to the target token request, where the target token packet includes a priority identifier of the data stream and the identifier of the data stream.

The priority identifier is used to indicate a token packet sending sequence. If the priority identifier corresponds to a higher priority, the target token packet is sent more preferentially. On the contrary, if the priority identifier corresponds to a lower priority, the target token packet is sent later.

During implementation, after receiving the target token request, the data receive end may parse the target token request to obtain the identifier of the data stream, the data volume of the data stream, and the data type that are carried in the target token request.

Then, the data receive end may determine, based on the data volume of the data stream and the data type, the priority identifier of the data stream carried in the target token request, and determine the priority identifier as a priority identifier of the target token packet corresponding to the target token request. Then, the data receive end generates a token packet (which may be subsequently referred to as the target token packet) corresponding to the target token request, and adds the priority identifier of the data stream and the identifier of the data stream to the target token packet.

Optionally, the target token packet may be further generated based on information about currently transmitted data, and corresponding processing may be as follows: determining the priority identifier of the data stream based on the data volume of the data, the data type, and the information about the currently transmitted data, and assembling the identifier of the data stream and the priority identifier into the target token packet corresponding to the target token request.

During implementation, after receiving the target token request, the data receive end may parse the target token request to obtain the identifier of the data stream, the data volume of the data stream, and the data type that are carried in the target token request.

Then, the data receive end may determine the priority identifier of the data stream based on the data volume of the data stream, the data type, and the information about the currently transmitted data, and then add the identifier of the data stream and the priority identifier to the target token packet.

Processing of determining the priority identifier of the data stream based on the data volume of the data, the data type, and the information about the currently transmitted data may be as follows: if the data volume of the data is less than or equal to a preset threshold, the data type is the video data type, and the currently transmitted data is not video data, determining that the priority identifier of the data stream is a first priority identifier, where the first priority identifier indicates a highest priority in all priority identifiers; if the data volume of the data is less than or equal to the preset threshold, the data type is the non-video data type, and the currently transmitted data is video data, determining that the priority identifier of the data stream is a second priority identifier, where a priority indicated by the second priority identifier is lower than a priority of the currently transmitted data; if the data volume of the data is greater than the preset threshold, the data type is the non-video data type, and the currently transmitted data is video data, determining that the priority identifier of the stream is a second priority identifier, where a priority indicated by the second priority identifier is lower than a priority of the currently transmitted data; or if the data volume of the data is greater than the preset threshold, the data type is the video data type, and the currently transmitted data is non-video data, determining that the priority identifier of the data stream is a first priority identifier, where the first priority identifier indicates a highest priority in all priorities.

The foregoing processing of determining the priority identifier of the data stream is merely an example.

In addition, to facilitate the transit device in rapidly recognizing a priority identifier of a received token packet, priority identifiers that can be used by data receive ends are the same. For example, priority identifiers that can be used by each data receive end are A, B, and C, and A, B, and C indicate priorities in descending order.

Optionally, to facilitate the data receive end in determining whether a data packet corresponding to a token packet has been received, the token packet further includes a sequence number, and corresponding processing may be as follows: determining a sequence number of the target token packet based on the identifier of the data stream, and assembling the identifier of the data stream, the sequence number of the target token packet, and the priority identifier into the target token packet corresponding to the target token request.

During implementation, for the data stream corresponding to the identifier of the data stream, when a token packet is generated, a sequence number is generated, where the sequence number is used to indicate a place of the token packet generated in the data stream corresponding to the identifier of the data stream. For example, if the target token packet is the third token packet that is generated, the sequence number is 3.

Then, the data receive end may assemble the identifier of the data stream, the sequence number of the target token packet, and the priority identifier into the target token packet corresponding to the target token request.

Step 605: The data receive end sends the target token packet to the transit device based on the priority identifier, so that the transit device sends the target token packet to the data transmit end.

Optionally, the target token packet may be sent based on a sending rate of the target token packet, and corresponding processing may be as follows: if it is time to send the target token packet based on the priority identifier and a sending rule, determining, by the data receive end, the sending rate of the target token packet, and sending the target token packet to the transit device based on the sending rate of the target token packet.

During implementation, the data receive end may set up a corresponding queue for each data stream for which a token request has been received, where a token packet having a higher priority in the queue is sent preferentially. When it is time to send the target token packet based on the priority identifier of the target token packet, the data receive end may determine the sending rate of the target token packet, and then send the target token packet to the transit device based on the sending rate of the target token packet.

Optionally, a method for determining the sending rate of the target token packet may be as follows: subtracting, by the data receive end, a sending rate of a token packet of a data stream other than the data stream to which the target token packet belongs in data streams currently being sent from a maximum sending rate of the current device, to obtain the sending rate of the target token packet.

During implementation, the data receive end may obtain a bandwidth of the data receive end, may obtain a data volume of each token packet, and then divide the bandwidth of the data receive end by the data volume of each token packet, to obtain a quantity of token packets that can be sent within one unit of time, namely, the maximum sending rate of the current device, for example, sending 10 token packets per second. Then, the data receive end determines the sending rate of the token packet of the data stream other than the data stream in the data streams currently being sent, and subtracts the sending rate of the token packet of the other data stream from the maximum sending rate, to obtain the sending rate of the target token packet.

For example, the maximum sending rate is sending 10 token packets per second, and sending rates of token packets of data streams other than the data stream to which the target token packet belongs are sending five token packets per second and sending three token packets per second. In this way, the sending rate of the data stream to which the target token packet belongs is sending two token packets per second, in other words, the sending rate of the target token packet is sending two token packets per second.

Optionally, to implement bandwidth utilization of the data receive end, a sending rate of a token packet of a data stream may be further adjusted, and corresponding processing may be as follows: for the data stream to which the target token packet belongs, if a packet loss rate of a token packet of the data stream is greater than a preset packet loss rate, decreasing a sending rate of the token packet based on a current sending rate; or if a packet loss rate of a token packet of the data stream is less than a preset packet loss rate, increasing a sending rate of the token packet based on a current sending rate, where the packet loss rate of the token packet is equal to a ratio of a quantity of token packets lost in one RTT to a quantity of sent token packets.

The preset packet loss rate may be preset and stored in the data receive end, for example, is 10%.

During implementation, for the data stream to which the target token packet belongs, after receiving a data packet, the data receive end may obtain a sequence number through parsing, and mark a token packet corresponding to the sequence number as used. In this way, the data receive end can determine a sent token packet whose corresponding data packet has been received. For any token packet, the data receive end may record a sending time point of the token packet, record a receiving time point of a data packet corresponding to the token packet, and then calculate a time difference. The data receive end may determine a quantity of token packets sent in this time period, may determine a quantity of token packets lost in this time period, and then obtain a ratio of the quantity of lost token packets to the quantity of sent token packets.

Then, the data receive end may compare the ratio with the preset packet loss rate. If the ratio is greater than the preset packet loss rate, the data receive end decreases the sending rate of the token packet based on the current sending rate of the data stream to which the target token packet belongs, to decrease the packet loss rate; if the ratio is less than the preset packet loss rate, the data receive end increases the sending rate of the token packet based on the current sending rate of the data stream to which the target token packet belongs, to improve bandwidth utilization of the data receive end; or if the ratio is equal to the preset packet loss rate, the data receive end does not adjust the current sending rate of the data stream to which the target token packet belongs.

In this way, the data receive end can dynamically adjust sending rates of token packets of different data streams based on the packet loss rate. Because the transit device preferentially transmits a token packet of a data stream having a higher priority, a packet loss rate of the corresponding token packet is lower, and the data receive end obtains a higher sending rate of the token packet, to preferentially complete transmission of the data stream having the higher priority. In addition, an algorithm of adjusting, by the data receive end, a sending rate of a token packet ensures that data streams having different priorities can converge quickly to achieve a stable rate, to implement full utilization of a bandwidth, in other words, bandwidth utilization.

It should be noted that increasing the sending rate of the token packet may be adding a preset number to the original sending rate of the token packet, or multiplying the original sending rate of the token packet by a number greater than 1; and increasing the sending rate of the token packet may be subtracting a preset number from the original sending rate of the token packet, or multiplying the original sending rate of the token packet by a number less than 1.

Step 606: The transit device receives the target token packet that is determined based on the target token request and that is sent by the data receive end, where the target token packet includes the priority identifier of the data stream and the identifier of the data stream.

Step 607: The transit device determines a sending rate of a token packet based on a link bandwidth of the current device, a preset packet length of a token packet, and a preset packet length of a data packet.

During implementation, after receiving the target token packet, the transit device may obtain the link bandwidth of the current device, obtain the preset packet length of the token packet and the preset packet length of the data packet that are pre-stored, and then determine the sending rate of the token packet based on the link bandwidth, the preset packet length of the token packet, and the preset packet length of the data packet.

Optionally, a method for determining the sending rate of the token packet may be as follows: determining the sending rate of the token packet based on the link bandwidth of the current device, the preset packet length of the token packet, the preset packet length of the data packet, and a formula W*A/(A+B).

During implementation, the transit device may obtain the pre-stored formula W*A/(A+B) of determining the sending rate of the token packet, may obtain the link bandwidth W of the current device, obtain the preset packet length A of the token packet and the preset packet length B of the data packet that are pre-stored, and substitute the link bandwidth W of the current device, the preset packet length A of the token packet, and the preset packet length B of the data packet into the formula W*A/(A+B) to obtain the sending rate of the token packet. For example, the preset packet length A of the token packet is 84 k, and the preset packet length B of the data packet is 1538 k. Then, the sending rate of the token packet is equal to 84/(84+1538)*W≈5%*W.

Step 608: The transit device sends the target token packet to the data transmit end based on the priority identifier and the sending rate of the token packet, so that the data transmit end sends a target data packet corresponding to the target token packet to the data receive end based on the target token packet.

During implementation, after determining the sending rate of the token packet, the transit device may send the target token packet to the data transmit end based on the priority identifier of the target token packet and the sending rate of the token packet. After receiving the target token packet, the data transmit end may parse the target token packet to obtain the identifier of the data stream, then find, by using the identifier of the data stream, data corresponding to the identifier of the data stream, obtain, based on the preset packet length of the data packet, data of a data volume of the preset packet length of the data packet from data corresponding to the identifier of the data stream, to constitute one data packet, namely, the data packet (which may be subsequently referred to as the target data packet) corresponding to the target token packet. Then, the data transmit end sends the target data packet. After receiving the target data packet corresponding to the target token packet, the transit device may send the target data packet corresponding to the target token packet to the data receive end.

Optionally, when generating the target token packet, the data receive end may determine a data volume that is allowed to be sent and that is carried in the target token packet, where the data volume that is allowed to be sent is used to indicate a data volume of data in the data packet that is sent by the data transmit end based on the target token packet. In this way, when the data transmit end sends the target data packet corresponding to the target token packet, a data volume of carried data is the same as the data volume carried in the target token packet. In this way, the data receive end can better control a data volume that can be received. Therefore, a possibility that data overflow occurs on the data receive end is relatively low.

Optionally, token packets may be set in different queues for sending based on different priority identifiers, and corresponding processing may be as follows: adding, based on the priority identifier, the target token packet to a second queue corresponding to the priority identifier, and when it is determined to send the target token packet in the second queue, sending the target token packet to the data transmit end based on the sending rate of the token packet.

A priority of the second queue is lower than the priority of the first queue. There is only one first queue, there may be a plurality of second queues, and the second queues correspond to different priority identifiers. For example, six second priority queues may be set.

During implementation, the transit device may parse the target token packet to obtain the priority identifier, then determine, based on the priority identifier, the second queue corresponding to the priority identifier, and then add the target token packet to the second queue corresponding to the priority identifier. When it is time to send the target token packet queuing in the second queue corresponding to the priority identifier, the transit device may send the target token packet to the data transmit end based on the sending rate of the token packet. For example, the first queue currently does not include a token request, and the second queue includes token packets A2, A1, B1, B2, and B3. The target token packet is A2, and A2 is sent after B3, B2, B1, and A1 are sent sequentially.

Herein, it should be noted that each time the data transmit end receives one token packet, one data packet is sent to the data transmit end.

Optionally, a data packet is generally sent based on a lowest priority, and corresponding processing of the transit device may be as follows: when receiving the target data packet corresponding to the target token packet, adding, by the transit device, the target data packet to a third queue, and when it is time to send the target data packet queuing in the third queue, sending the target data packet to the data receive end.

A priority of the third queue is lower than the priority of the second queue. The third queue is a queue having a lowest priority.

During implementation, when receiving the data packet that is sent by the data transmit end and that corresponds to the target token packet, the transit device may add the target data packet to the third queue, and then may send the target data packet to the data receive end when it is time to send the target data packet queuing in the third queue.

Figure 7:
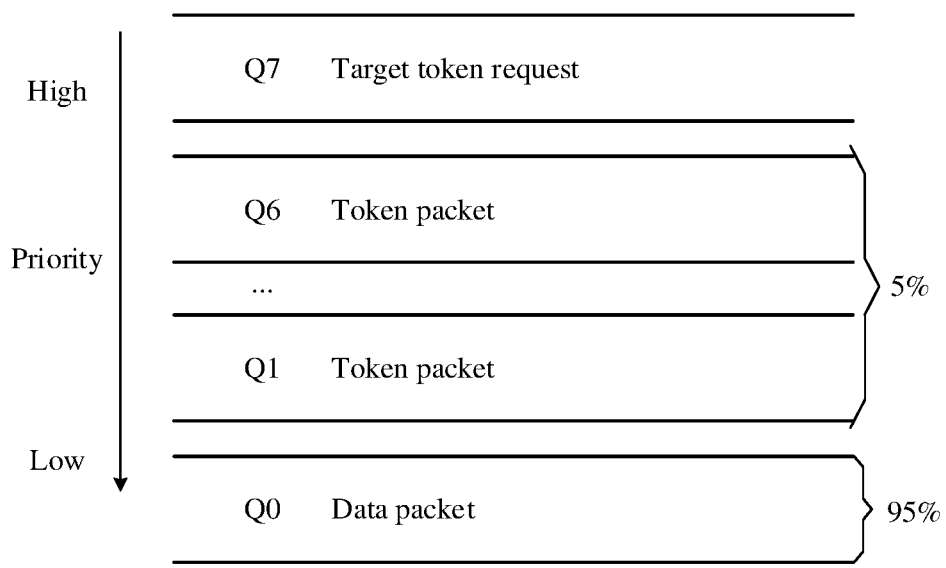
FIG. 7 is a schematic diagram of priority queues according to an embodiment of this application.

It should be further noted that because a total rate at which token packets from different data receive ends arrive at the transit device may exceed the sending rate of the token packet, the token packets may queue in queues, and after a queuing length of each queue exceeds a preset threshold (the preset threshold may be preset and stored in the transit device), the transit device may discard redundant token packets. In a process of sending a token packet based on the sending rate, a token packet having a higher priority is sent preferentially, and a corresponding data packet is sent preferentially; a token packet having a lower priority is sent after the token packet having the higher priority, and a corresponding data packet is sent later. Therefore, there is a higher possibility that the token packet having the lower priority is discarded. For example, each port of an existing transit device usually has eight priority queues. As shown in FIG. 7, there are eight priority queues from top to bottom, and priorities are in descending order from top to bottom. A queue Q0 having a lowest priority is a transmission queue of a data packet, a queue Q7 having a highest priority is a queue of a target token request, queues Q1 to Q6 having other priorities are queues of token packets, and a total sending rate of the queues of the token packets is the sending rate of the token packet. Because the target token request is sent based on a highest priority, occupation of the sending rate may be ignored. In this way, the sending rate of the data packet is equal to the total sending rate of the transit device minus the sending rate of the token packet. If the sending rate of the token packet accounts for 5%, the sending rate of the data packet accounts for 95%. In this way, the data packet enters the queue Q0 for sending, the target token request enters the queue Q7 for sending, and token packets having different priorities correspondingly enter priority queues Q6 to Q1 for sending. The transit device limits the rate of the token packet, to reserve a transmission link of an inverse data packet, and avoid congestion of a transmission link of a data packet. In addition, token packets having different priorities are scheduled and discarded by using a switch, to differentially treat different data streams, so that transmission of a data stream having a higher priority can be completed preferentially.

Step 609: The data receive end receives the target data packet that is forwarded by the transit device and that corresponds to the target token packet.

During implementation, after receiving the target data packet, the data receive end may determine a sequence number carried in the target data packet, and can determine, based on the sequence number, that the target data packet is the target data packet corresponding to the target token packet.

Optionally, to save a transmission resource, after completely sending data, the data transmit end may send a token transmission termination message to the data receive end, and corresponding processing of the transit device may be as follows: receiving, by the transit device, the token transmission termination message sent by the data transmit end, where the token transmission termination message carries the identifier of the data stream; adding the token transmission termination message to the first queue; and when it is time to send the token transmission termination message queuing in the first queue, sending the token transmission termination message to the data receive end, so that the data receive end no longer sends a token packet corresponding to the data stream.

During implementation, the data transmit end determines, based on a total data volume of data packets sent to the data receive end, that the data stream sent to the data receive end is completely sent, and then may generate the token transmission termination message, add the identifier of the data stream to the token transmission termination message, and then send the token transmission termination message to the transit device.

After receiving the token transmission termination message, the transit device may add the token transmission termination message to the first queue, and when it is time to send the token termination message queuing in the first queue, the transit device may send the token transmission termination message to the data receive end.

After receiving the token transmission termination message, the data receive end may obtain the identifier of the data stream through parsing, determine that the data stream is completely sent, and may stop generating a token packet corresponding to the data stream.

In addition, the token transmission termination message further carries a data volume of data that has been sent to the data receive end. After receiving the token transmission termination message, the data receive end may obtain the data volume through parsing, and determine, based on the data volume, whether all data sent by the data transmit end to the data receive end has been received.

In addition, when duration between a time point of receiving, by the data receive end, the last data packet and a current time point exceeds preset duration, if a data packet of a data stream to which the data packet belongs has not been received, the data receive end may determine that the data stream corresponding to the data packet is completely sent, and may stop generating a token packet corresponding to the data stream.

In addition, when sending the target token request, the data transmit end may further add a time point of sending the target token request to the target token request, and corresponding processing of the data receive end may be as follows:

The target token request further includes the sending time point of the target token request. If a time interval between the sending time point and a current time point exceeds a preset threshold, the target token request is discarded.

During implementation, after receiving the target token request, the data receive end may obtain the sending time point of the target token request through parsing, then determine a receiving time point of the target token request, calculate a difference between the receiving time point and the sending time point, and if the difference is greater than a preset threshold, discard the target token request.

Optionally, in the foregoing embodiment, main fields of the target token request and the token transmission termination message may be shown in Table 1:

TABLE 1

| Message name | Type | Field content | | | |
| --- | --- | --- | --- | --- | --- |
| | | Sequence number | Identifier of a data stream | Timestamp | Data |
| Token request | 0 | Sequence number used to uniquely identify a message | Identifier of a data stream that is to be transmitted | Sending time point | Data volume and a data type of a data stream |
| Token transmission termination message | 1 | Sequence number used to uniquely identify a message | Identifier of a data stream whose transmission is to be terminated | Sending time point | Data volume of data that has been sent to the data receive end |

Optionally, in the foregoing embodiment, main fields of a token packet may be shown in Table 2:

TABLE 2

| | | Field content | | | |
|---|---|---|---|---|---|
| Message name | Type | Identifier of a data stream | Sequence number of a token | Timestamp | Data |
| Token packet | 2 | Identifier of a data stream to which a token packet belongs | Sequence number used to uniquely identify a token packet of a data stream | Sending time point | Priority of a token packet |

In addition, data of a token packet may further include a data volume that is allowed to be sent. In this way, when sending data, the data transmit end sends data based on the data volume specified in the token packet.

Optionally, in the foregoing embodiment, main fields of a data packet may be shown in Table 3:

TABLE 3

| | | Field content | | | |
|---|---|---|---|---|---|
| Message name | Type | Identifier of a data stream | Sequence number of a token | Timestamp | Data |
| Data packet | 3 | Identifier of a data stream to which a data packet belongs | Sequence number used to uniquely identify a token packet corresponding to a data packet | Sending time point | Data volume, data content |

It should be noted that the type in the field content is used to identify a type of a message. For example, a type being 3 is used indicate that a message is a data packet, and a type being 2 is used to indicate that a message is a token packet.

It should be further noted that if the foregoing embodiment is applied to the application scenario 1, both the data transmit end and the data receive end are servers in a data center network, data of a sent data packet may be data that has been processed by the data transmit end and that is to be sent to the data receive end, and the transit device may be a switch between the data transmit end and the data receive end.

If the foregoing embodiment is applied to the application scenario 2, when the data transmit end is a data collector, the data receive end may be a storage server or an analysis server. In this case, control of a token request and a token packet is set in the data collector, to avoid large-scale one-time upgrade on a sensor, so that a solution deployment time can be shortened, and running efficiency can be improved. Alternatively, when the data transmit end is a storage server, the data receive end may be an analysis server, and when the analysis server performs data analysis, the analysis server obtains stored data from the storage server. Alternatively, when the data transmit end is an analysis server, the data receive end may be a controller. Alternatively, when the data transmit end is a controller, the data receive end may be an executor. In the several cases, the transit device is a switch.

If the foregoing embodiment is applied to the application scenario 3, when the data transmit end is a server in a data center, the data receive end may be a base station and the transit device is a P-GW. In addition, if a switch is disposed between servers in the data center, both the data transmit end and the data receive end are servers in the data center, and the transit device may be also a switch.

It should be further noted that when the foregoing embodiment is applied to the application scenario 2, the data type of the data stream may be determined by the data collector based on a sensor from which data is obtained, and different sensors may correspond to different data types.

In addition, when the foregoing embodiment is applied to the scenario 3, although the data receive end is a base station, actually, the UE initiates a content request link. After the content request link arrives at the base station (the data receive end), the base station may initiate a new link to a content storing server (the data transmit end) in a data center. After responding to the request, the server in the data center starts preparing to send data, and sends the target token request to the base station. For subsequent processing, refer to step 601 to step 609. After receiving the target data packet that is sent by the server in the data center and that corresponds to the target token packet, the base station may send the target data packet to UE. In this way, the UE can obtain the data. In this case, control of the token request and the token packet is set in the base station, to avoid modification on the UE, facilitate deployment, and improve running efficiency of an LTE network and a 5G network.

In addition, in the foregoing three application scenarios, the transit device may change a queue scheduling algorithm in an original drive or directly replace an original chip, to implement processing executed by the transit device, and the data receive end may set a new algorithm in a network protocol stack, or add a new module to a SmartNIC (smart network interface card), to implement processing executed by the data receive end.

In this embodiment of this application, a data packet is sent based on a token packet. Because the token packet is active congestion control driven by the data receive end, a data packet sending rate of the data transmit end is lower than a quantity of token packets received within one unit of time, to ensure that data packets entering a network do not exceed a capacity of a network link, avoid congestion in advance before the data packets enter the network, and implement low-latency data transmission. In addition, low-latency transmission of a data packet can reduce a packet loss rate of the data packet, and reducing the packet loss rate of the data packet can further ensure high bandwidth utilization and high throughput of the network.

In this embodiment of this application, the transit device may receive the target token request sent by the data transmit end, where the target token request carries the identifier of the data stream, the data volume of the data stream, and the data type. Then, the transit device sends the target token request to the data receive end, and after receiving the target token request, the data receive end may determine, based on the target token request, the target token packet corresponding to the target token request, where the target token packet includes the priority identifier of the data stream and the identifier of the data stream. Then, the data receive end sends the target token packet to the transit device based on the priority identifier. After receiving the target token packet, the transit device may determine the sending rate of the token packet based on the link bandwidth of the current device, the preset packet length of the token packet, and the preset packet length of the data packet, and then send the target token packet to the data transmit end based on the priority identifier and the sending rate of the token packet, so that the data transmit end sends the target data packet corresponding to the target token packet to the data receive end based on the target token packet. After receiving the target data packet sent by the data transmit end, the transit device may send the target data packet to the data receive end. Because the transit device can determine the sending rate of the token packet, and can send the token packet based on the priority identifier and the sending rate, network congestion can be controlled actively during data sending, and a possibility of network congestion can be reduced, to reduce a packet loss rate of a data packet, implement low-latency data transmission, and further ensure high bandwidth utilization and high throughput of a network.

Figure 8:
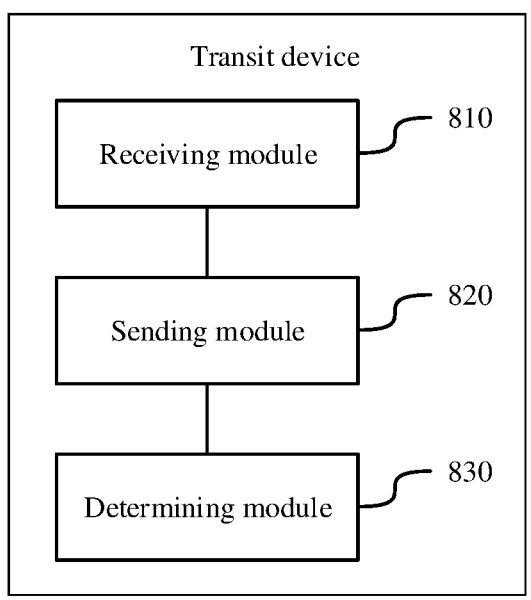
FIG. 8 is a schematic structural diagram of a transit device according to an embodiment of this application.

FIG. 8 is a schematic structural diagram of a transit device according to an embodiment of this application. The transit device may be implemented as a part or all of the transit device by using software, hardware, or a combination of both. The transit device provided in this embodiment of this application may implement the process in FIG. 6 of the embodiments of this application. The transit device includes a receiving module 810, a sending module 820, and a determining module 830.

The receiving module 810 is configured to receive a target token request sent by a data transmit end, where the target token request carries an identifier of a data stream, a data volume of the data stream, and a data type; and may be specifically configured to implement a receiving function in step 601 and an included hidden step.

The sending module 820 is configured to forward the target token request to a data receive end; and may be specifically configured to implement a sending function in step 602 and an included hidden step.

The receiving module 810 is further configured to receive a target token packet that is determined based on the target token request and that is sent by the data receive end, where the target token packet includes a priority identifier of the data stream and the identifier of the data stream; and may be specifically configured to implement a receiving function in step 606 and an included hidden step.

The determining module 830 is configured to determine a sending rate of a token packet based on a link bandwidth of the current device, a preset packet length of a token packet, and a preset packet length of a data packet; and may be specifically configured to implement a sending function in step 607 and an included hidden step.

The sending module 820 is further configured to send the target token packet to the data transmit end based on the priority identifier and the sending rate of the token packet, so that the data transmit end sends a target data packet corresponding to the target token packet to the data receive end based on the target token packet; and may be specifically configured to implement a sending function in step 608 and an included hidden step.

Optionally, the determining module 830 is configured to: determine the sending rate of the token packet based on the link bandwidth of the current device, the preset packet length of the token packet, the preset packet length of the data packet, and a formula $W*A/(A+B)$, where W is the link bandwidth, A is the preset packet length of the token packet, and B is the preset packet length of the data packet.

Optionally, the sending module 820 is configured to: add the target token request to a first queue, where the first queue is a queue having a highest priority in the current device; and when it is time to send the target token request queuing in the first queue, forward the target token request to the data receive end.

Optionally, the sending module 820 is further configured to: add, based on the priority identifier, the target token packet to a second queue corresponding to the priority identifier, where a priority of the second queue is lower than the priority of the first queue; and when it is determined to send the target token packet in the second queue, send the target token packet to the data transmit end based on the sending rate of the token packet.

Optionally, the sending module 820 is further configured to: when the target data packet corresponding to the target token packet is received, add the target data packet to a third queue, where a priority of the third queue is lower than the priority of the second queue; and when it is time to send the target data packet queuing in the third queue, send the target data packet to the data receive end.

Optionally, the receiving module 810 is further configured to: receive a token transmission termination message sent by the data transmit end, where the token transmission termination message carries the identifier of the data stream; and the sending module 820 is further configured to: send the token transmission termination message to the data receive end, so that the data receive end no longer sends a token packet corresponding to the data stream.

It should be noted that when the transit device provided in the foregoing embodiment controls network congestion, division into the foregoing functional modules is merely used as an example for description. In practice, the functions may be allocated to different functional modules for implementation as required. To be specific, an internal structure of the transit device is divided into different functional modules to implement all or some of the functions described above. In addition, the transit device provided in the foregoing embodiment and the embodiment of the network congestion control method belong to a same idea. For a specific implementation process thereof, refer to the method embodiment, and details are not described herein again.

Figure 9:
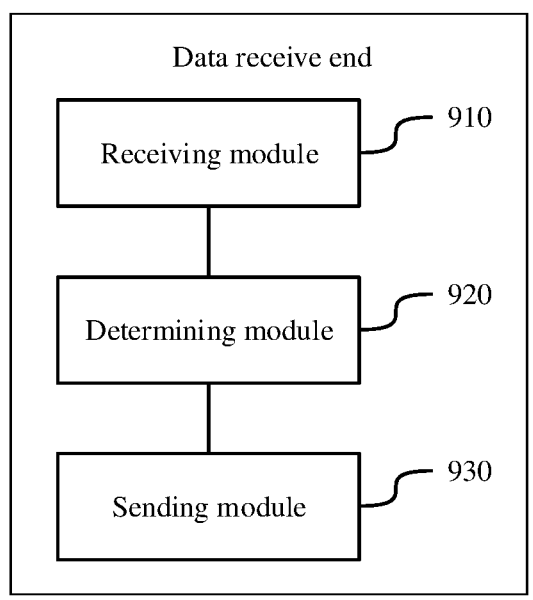
FIG. 9 is a schematic structural diagram of a data receive end according to an embodiment of this application.

FIG. 9 is a schematic structural diagram of a data receive end according to an embodiment of this application. The data receive end may be implemented as a part or all of the data receive end by using software, hardware, or a combination of both. The data receive end provided in this embodiment of this application may implement the process in FIG. 6 of the embodiments of this application. The data receive end includes a receiving module 910, a determining module 920, and a sending module 930.

The receiving module 910 is configured to receive a target token request sent by a transit device, where the target token request carries an identifier of a data stream, a data volume of the data stream, and a data type; and may be specifically configured to implement a receiving function in step 603 and an included hidden step.

The determining module 920 is configured to determine, based on the target token request, a target token packet corresponding to the target token request, where the target token packet includes a priority identifier of the data stream and the identifier of the data stream; and may be specifically configured to implement a determining function in step 604 and an included hidden step.

The sending module 930 is configured to send the target token packet to the transit device based on the priority identifier, so that the transit device sends the target token packet to a data transmit end; and may be specifically configured to implement a sending function in step 605 and an included hidden step.

The receiving module 910 is further configured to receive a target data packet that is forwarded by the transit device and that corresponds to the target token packet; and may be specifically configured to implement a receiving function in step 609 and an included hidden step.

Optionally, the determining module 920 is configured to: determine the priority identifier of the data stream based on the data volume of the data, the data type, and information about currently transmitted data; and assemble the identifier of the data stream and the priority identifier into the target token packet corresponding to the target token request.

Optionally, the determining module 920 is further configured to: determine a sequence number of the target token packet based on the identifier of the data stream; and the assembling the identifier of the data stream and the priority identifier into the target token packet corresponding to the target token request includes: assembling the identifier of the data stream, the sequence number of the target token packet, and the priority identifier into the target token packet corresponding to the target token request.

Optionally, the sending module 930 is configured to: if it is time to send the target token packet based on the priority identifier and a sending rule, determine a sending rate of the target token packet, and send the target token packet to the transit device based on the sending rate of the target token packet.

Optionally, the determining module 920 is further configured to: subtract a sending rate of a token packet of a data stream currently being sent from a maximum sending rate of current device, to obtain the sending rate of the target token packet.

Optionally, the determining module 920 is further configured to: for the data stream, if a packet loss rate of a token packet of the data stream is greater than a preset packet loss rate, decrease a sending rate of the token packet based on a current sending rate; or if a packet loss rate of a token packet of the data stream is less than a preset packet loss rate, increase a sending rate of the token packet based on a current sending rate, where the packet loss rate of the token packet is equal to a ratio of a quantity of token packets lost in one RTT to a quantity of sent token packets.

In this embodiment of this application, the transit device may receive the target token request sent by the data transmit end, where the target token request carries the identifier of the data stream, the data volume of the data stream, and the data type. Then, the transit device sends the target token request to the data receive end, and after receiving the target token request, the data receive end may determine, based on the target token request, the target token packet corresponding to the target token request, where the target token packet includes the priority identifier of the data stream and the identifier of the data stream. Then, the data receive end sends the target token packet to the transit device based on the priority identifier. After receiving the target token packet, the transit device may determine the sending rate of the token packet based on the link bandwidth of the current device, the preset packet length of the token packet, and the preset packet length of the data packet, and then send the target token packet to the data transmit end based on the priority identifier and the sending rate of the token packet, so that the data transmit end sends the target data packet corresponding to the target token packet to the data receive end based on the target token packet. After receiving the target data packet sent by the data transmit end, the transit device may send the target data packet to the data receive end. Because the transit device can determine the sending rate of the token packet, and can send the token packet based on the priority identifier and the sending rate, network congestion can be controlled actively during data sending, and a possibility of network congestion can be reduced, to reduce a packet loss rate of a data packet, implement low-latency data transmission, and further ensure high bandwidth utilization and high throughput of a network.

It should be noted that when the data receive end provided in the foregoing embodiment controls network congestion, division into the foregoing functional modules is merely used as an example for description. In practice, the functions may be allocated to different functional modules for implementation as required. To be specific, an internal structure of the data receive end is divided into different functional modules to implement all or some of the functions described above. In addition, the data receive end provided in the foregoing embodiment and the embodiment of the network congestion control method belong to a same idea. For a specific implementation process thereof, refer to the method embodiment, and details are not described herein again.

This application further provides a computer-readable storage medium. The computer-readable storage medium stores an instruction. When the computer-readable storage medium is run on a transit device, the transit device is enabled to perform the network congestion control method.

This application further provides a computer-readable storage medium. The computer-readable storage medium stores an instruction. When the computer-readable storage medium is run on a data receive end, the data receive end is enabled to perform the network congestion control method.

This application further provides a computer program product including an instruction. When the computer program product is run on a transit device, the transit device is enabled to perform the network congestion control method.

This application further provides a computer program product including an instruction. When the computer program product is run on a data receive end, the data receive end is enabled to perform the network congestion control method.

This application further provides a network congestion control system. The system includes a data receive end and a transit device.

The transit device is configured to perform the network congestion control method.

The data receive end is configured to perform the network congestion control method.

All or some of the foregoing embodiments may be implemented by software, hardware, firmware, or any combination thereof. When implemented by software, all or some may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, a magnetic tape, or the like), an optical medium (for example, a digital video disk (DVD), or the like), a semiconductor medium (for example, a solid-state drive, or the like).

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method, comprising:
   receiving a target token request sent by a data transmit end, wherein the target token request carries an identifier of a data stream, a data volume of the data stream, and a data type;
   forwarding the target token request to a data receive end;
   receiving a target token packet that is determined based on the target token request and that is sent by the data receive end, wherein the target token packet comprises a priority identifier of the data stream and the identifier of the data stream;
   determining a sending rate of the target token packet based on a link bandwidth of a current device, a preset packet length of a token packet, and a preset packet length of a data packet; and
   sending the target token packet to the data transmit end based on the priority identifier and the sending rate of the target token packet, wherein the data transmit end sends a target data packet corresponding to the target token packet to the data receive end based on the target token packet.

2. The method according to claim 1, wherein determining the sending rate of the target token packet based on the link bandwidth of the current device, the preset packet length of the token packet, and the preset packet length of the data packet comprises:
   determining the sending rate of the target token packet based on the link bandwidth of the current device, the preset packet length of the token packet, the preset packet length of the data packet, and a formula W*A/(A+B), wherein W is the link bandwidth, A is the preset packet length of the token packet, and B is the preset packet length of the data packet.

3. The method according to claim 1, wherein forwarding the target token request to the data receive end comprises:
   adding the target token request to a first queue, wherein the first queue has a highest priority in the current device; and
   when it is time to send the target token request queuing in the first queue, forwarding the target token request to the data receive end.

4. The method according to claim 3, wherein sending the target token packet to the data transmit end based on the priority identifier and the sending rate of the target token packet comprises:
   adding, based on the priority identifier, the target token packet to a second queue corresponding to the priority identifier, wherein a priority of the second queue is lower than the priority of the first queue; and
   when it is determined to send the target token packet in the second queue, sending the target token packet to the data transmit end based on the sending rate of the target token packet.

5. The method according to claim 4, further comprising:
   when the target data packet corresponding to the target token packet is received, adding the target data packet to a third queue, wherein a priority of the third queue is lower than the priority of the second queue; and
   when it is time to send the target data packet queuing in the third queue, sending the target data packet to the data receive end.

6. The method according to claim 1, further comprising:
   receiving a token transmission termination message sent by the data transmit end, wherein the token transmission termination message carries the identifier of the data stream; and
   sending the token transmission termination message to the data receive end, causing the data receive end to no longer send a token packet corresponding to the data stream.

7. A device, comprising:
   a receiver;
   a transmitter;
   a processor; and
   a non-transitory computer-readable storage medium storing a program to be executed by the processor, the program including instructions for:
      receiving, using the receiver, a target token request sent by a data transmit end, wherein the target token request carries an identifier of a data stream, a data volume of the data stream, and a data type;
      forwarding, using the transmitter, the target token request to a data receive end;
      receiving, using the receiver, a target token packet that is determined based on the target token request and that is sent by the data receive end, wherein the target token packet comprises a priority identifier of the data stream and the identifier of the data stream;
      determining a sending rate of the target token packet based on a link bandwidth of a current device, a preset packet length of a token packet, and a preset packet length of a data packet; and
      sending, using the transmitter, the target token packet to the data transmit end based on the priority identifier and the sending rate of the target token packet, causing the data transmit end to send a target data packet corresponding to the target token packet to the data receive end based on the target token packet.

8. The device according to claim 7, wherein the program includes instructions for:
  determining the sending rate of the target token packet based on the link bandwidth of the current device, the preset packet length of the token packet, the preset packet length of the data packet, and a formula W*A/(A+B), wherein W is the link bandwidth, A is the preset packet length of the token packet, and B is the preset packet length of the data packet.

9. The device according to claim 8, wherein the program includes instructions for:
  adding the target token request to a first queue, wherein the first queue is a queue having a highest priority in the current device; and
  when it is time to send the target token request queuing in the first queue, forwarding the target token request to the data receive end.

10. The device according to claim 9, wherein the program includes instructions for:
  adding, based on the priority identifier, the target token packet to a second queue corresponding to the priority identifier, wherein a priority of the second queue is lower than the priority of the first queue; and
  when it is determined to send the target token packet in the second queue, sending the target token packet to the data transmit end based on the sending rate of the target token packet.

11. The device according to claim 10, wherein the program includes instructions to:
  when a target data packet corresponding to the target token packet is received, add the target data packet to a third queue, wherein a priority of the third queue is lower than the priority of the second queue; and
  when it is time to send the target data packet queuing in the third queue, send the target data packet to the data receive end.

12. The device according to claim 7, wherein the program further includes instructions to:
  receive, using the receiver, a token transmission termination message sent by the data transmit end, wherein the token transmission termination message carries the identifier of the data stream; and
  send, using the transmitter, the token transmission termination message to the data receive end, causing the data receive end to no longer send a token packet corresponding to the data stream.

13. A device, comprising:
  a receiver;
  a transmitter;
  a processor; and
  a non-transitory computer-readable storage medium storing a program to be executed by the processor, the program including instructions for:
    receiving, using the receiver, a target token request sent by a transit device, wherein the target token request carries an identifier of a data stream, a data volume of the data stream, and a data type;
    determining, based on the target token request, a target token packet corresponding to the target token request, wherein the target token packet comprises a priority identifier of the data stream and the identifier of the data stream;
    sending, using the transmitter, the target token packet to the transit device based on the priority identifier, causing the transit device to send the target token packet to a data transmit end; and
    receiving a target data packet that is forwarded by the transit device and that corresponds to the target token packet.

14. The device according to claim 13, wherein the program includes instructions for:
  determining the priority identifier of the data stream based on the data volume of the data, the data type, and information about currently transmitted data; and
  assembling the identifier of the data stream and the priority identifier into the target token packet corresponding to the target token request.

15. The device according to claim 14, wherein the program includes instructions for:
  determining a sequence number of the target token packet based on the identifier of the data stream; and
  wherein assembling the identifier of the data stream and the priority identifier into the target token packet corresponding to the target token request comprises:
    assembling the identifier of the data stream, the sequence number of the target token packet, and the priority identifier into the target token packet corresponding to the target token request.

16. The device according to claim 13, wherein the program includes instructions for:
  based on the priority identifier, and when it is time to send the target token packet based on a sending rule, determining a sending rate of the target token packet; and
  sending the target token packet to the transit device based on the sending rate of the target token packet.

17. The device according to claim 13, wherein the program includes instructions for:
  subtracting a sending rate of a token packet of a data stream currently being sent from a maximum sending rate of a current device, to obtain a sending rate of the target token packet.

18. The device according to claim 17, wherein the program further includes instructions for:
  when a packet loss rate of a token packet of the data stream is greater than a preset packet loss rate, decreasing a sending rate of the token packet based on a current sending rate, wherein the packet loss rate of the token packet is equal to a ratio of a quantity of token packets lost in one round trip time (RTT) to a quantity of sent token packets.

19. The device according to claim 17, wherein the program further includes instructions for:
  when a packet loss rate of a token packet of the data stream is less than a preset packet loss rate, increasing a sending rate of the token packet based on a current sending rate, wherein the packet loss rate of the token packet is equal to a ratio of a quantity of token packets lost in one round trip time (RTT) to a quantity of sent token packets.

* * * * *